United States Patent
Lee

(10) Patent No.: US 6,959,686 B2
(45) Date of Patent: Nov. 1, 2005

(54) FUEL INJECTION TIMING CONTROL METHOD AND SYSTEM THEREOF

(75) Inventor: Tae Seong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/982,123

(22) Filed: Nov. 5, 2004

(65) Prior Publication Data

US 2005/0098146 A1 May 12, 2005

(30) Foreign Application Priority Data

Nov. 7, 2003 (KR) .................. 10-2003-0078681

(51) Int. Cl.⁷ .............. F02B 5/00; F02D 1/16; F02D 41/40; F02D 23/00
(52) U.S. Cl. .............. 123/305; 123/494; 123/564; 701/105
(58) Field of Search .............. 123/305, 559.1, 123/564, 494; 701/103–105

(56) References Cited

U.S. PATENT DOCUMENTS 6,814,060 B1 * 11/2004 Solomons et al. .......... 123/501
2005/0022503 A1 * 2/2005 Miura ....................... 60/274

FOREIGN PATENT DOCUMENTS

GB 2404997 * 2/2005 .......... F02D/23/02
JP 61-055344 3/1986

* cited by examiner

Primary Examiner—Hai Huynh
(74) Attorney, Agent, or Firm—Morgan Lewis & Bockius LLP

(57) ABSTRACT

A fuel injection timing control system and method is provided including steps of: determining a base fuel injection timing, calculating a reference boost pressure based on a current engine operating condition, calculating a fuel injection timing compensation value based on a difference between the calculated reference boost pressure and a current boost pressure, and calculating a final fuel injection timing by compensating the base fuel injection timing with the fuel injection timing compensation value.

20 Claims, 2 Drawing Sheets

FUEL INJECTION TIMING CONTROL METHOD AND SYSTEM THEREOF

CROSS REFERENCE TO RELATED APPLICATIONS

This application claims priority of Korean Application No. 10-2003-0078681, filed on Nov. 7, 2003, the disclosure of which is incorporated herein by reference.

TECHNICAL FIELD OF THE INVENTION

The present invention relates to a fuel injection control for a diesel engine, and more particularly, to a system and a method for controlling fuel injection timing using a boost pressure.

BACKGROUND OF THE INVENTION

Recently developed diesel engines are provided with a turbo intercooler intake system for decreasing an amount of exhaust emissions. Such diesel engines are generally called turbo diesel engines.

As is generally known, a turbo diesel engine includes a turbocharger for pressurizing intake air using energy of exhaust gas, and an intercooler for cooling the pressurized intake air. In such a turbo diesel engine, pressurized air is supplied to combustion chambers so that the amount of oxygen supplied to the combustion chambers is increased. Therefore, combustion characteristics can be improved, and fuel economy can also be improved because pumping loss that is generated when introducing air into a cylinder can be decreased.

In such a turbo diesel engine, fuel injection is controlled mainly based on boost pressure, which means the pressure within the air intake pipe downstream of the turbocharger. If the driver depresses the acceleration pedal while the engine is operating, an engine control unit calculates a required amount of fuel in proportion to the amount of acceleration pedal travel (i.e., an acceleration pedal value).

If the calculated required amount of fuel is less than a predetermined smoke fuel limit that is determined according to an intake air pressure, fuel injection control is performed by a calculated required amount of fuel. However, if the calculated required amount of fuel is greater than the predetermined smoke fuel limit, fuel injection control is performed by a predetermined smoke fuel limit. Here, the smoke fuel limit is a maximum amount of fuel that is determined according to pressures of intake air such that incomplete combustion due to a shortage of an intake air can be prevented.

Under such fuel injection control, even though a required amount of fuel is increased by the acceleration pedal value, an amount of fuel corresponding to the predetermined smoke fuel limit is injected if a current pressure of intake air is not sufficiently high.

Fuel injection timing is maintained as a value that is determined based on engine speed (rpm) regardless of the intake air pressure. If the acceleration pedal is abruptly depressed for rapid acceleration, a required amount of fuel frequently becomes greater than the smoke fuel limit. In this condition, because the actual amount of fuel is limited to the smoke fuel limit, an increase of energy of exhaust gas due to an increase of an amount of injected fuel is delayed. Consequently, rotational speed of the turbocharger is also delayed, so that a time lag for the intake air pressure to reach a value corresponding to the required amount of fuel occurs.

A delay of an increase of the intake air pressure brings about a delay of an increase of engine torque. This phenomenon is generally referred to as a turbo lag.

In a TCI (Transistor Controlled Ignition) diesel engine, the effect of turbo lag on power efficiency is significant, and an engine having a relatively large turbo lag has poor acceleration performance and consumes much more fuel during acceleration. If the smoke fuel limit is determined as a relatively high value in order to improved acceleration performance, the amount of smoke due to incomplete combustion increases substantially.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a fuel injection timing control system and a method thereof for solving a delay of acceleration, an increase of an amount of fuel consumed, and generation of smoke, which are caused by a turbo lag of a turbo diesel engine.

In a preferred embodiment of the present invention, a fuel injection timing control method comprises: determining a base fuel injection timing: calculating a reference boost pressure based on a current engine operating condition; calculating a fuel injection timing compensation value based on a difference between the calculated reference boost pressure and a current boost pressure; and calculating a final fuel injection timing by compensating the base fuel injection timing with the fuel injection timing compensation value.

It is preferable that the calculating a reference boost pressure comprises: calculating a base reference boost pressure based on the current engine operating condition; and calculating the reference boost pressure by compensating the base reference boost pressure with at least one compensation parameter.

It is also preferable that the calculating the reference boost pressure comprises: calculating a base reference boost pressure compensation factor based on the at least one compensation parameter; and calculating the reference boost pressure by compensating the base reference boost pressure with the base reference boost pressure compensation factor.

Preferably, the base reference boost pressure is calculated using a base reference boost pressure table having base reference boost pressure values determined for the current engine operating condition and a predetermined engine operating condition.

Further preferably, the current engine operating condition comprises a current engine speed and a current fuel injection amount.

It is preferable that the base reference boost pressure compensation factor is calculated using a base reference boost pressure compensation factor table having base reference boost pressure compensation factor values determined for the at least one compensation parameter and a predetermined parameter.

It is further preferable that the compensation parameter comprises an atmospheric pressure and an intake air temperature.

Preferably, the reference boost pressure is calculated by multiplying the base reference boost pressure by the base reference boost pressure compensation factor.

It is preferable that the fuel injection timing compensation value is determined as a value that further advances the fuel injection timing as a difference between the reference boost pressure and the current boost pressure increases.

The base fuel injection timing is preferably determined based on an engine speed and a fuel injection amount.

In another embodiment of the present invention, a fuel injection timing control system comprises: at least one engine operating condition sensor for detecting an engine operating condition; a boost pressure sensor for detecting a boost pressure; a fuel injector for injecting fuel into a combustion chamber; and a control unit for controlling fuel injection timing of the fuel injector based on the engine operating condition and the boost pressure. The control unit is programmed to perform instructions for performing the above-stated fuel injection timing control method.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
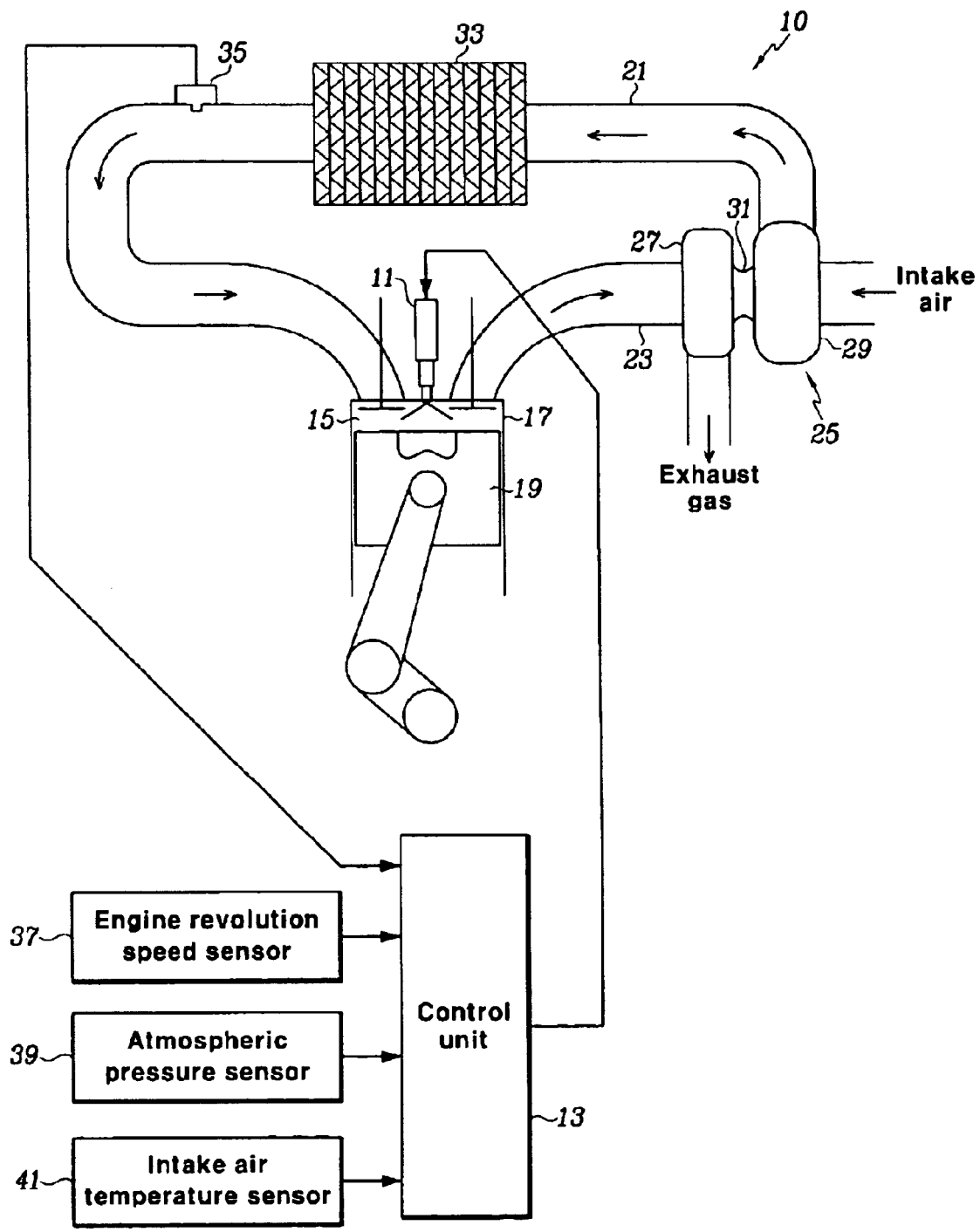
FIG. 1 is a schematic block diagram of a fuel injection timing control system according to an embodiment of the present invention.

As shown in FIG. 1, a fuel injection timing control system 10 according to an embodiment of the present invention comprises a fuel injector 11 and a control unit 13 for controlling fuel injection timing of the fuel injector 11. The fuel injector 11 is a device for injecting fuel into a combustion chamber 15. An amount of fuel and the timing of fuel injection of the fuel injector 11 are controlled by control signal of the control unit 13.

The combustion chamber 15 is a space defined by a cylinder block 17 and a piston 19, and fuel is burned in the combustion chamber 15. An intake is supplied to the combustion chamber through an intake manifold 21, and exhaust gas generated in the combustion chamber 15 is exhausted through an exhaust manifold 23. A turbocharger 25 for pressurizing an intake air using an energy of exhaust gas is provided.

The turbocharger 25 comprises a turbine 27 connected to the exhaust manifold 23, a compressor 29 that is connected to the intake manifold 21, and a connecting shaft 31 connecting the turbine 27 and the compressor 29. The turbine 27 is driven by an energy of the exhaust gas flowing in the exhaust manifold 23, and the compressor 29 rotates integrally with the turbine 27. An intake air is pressurized by a rotation of the compressor 29.

An intercooler 33 for cooling the pressurized air is provided in the intake manifold 21 at a downstream of the turbocharger 25. A boost pressure sensor 35 is installed in the intake manifold downstream of the intercooler 33. The boost pressure sensor 35 detects the pressure (i.e., boost pressure) of intake air introduced into the combustion chamber 15 and outputs a boost pressure signal corresponding to the detected boost pressure to the control unit 13.

A fuel injection timing control system 10 according to an embodiment of the present invention also comprises an engine revolution speed sensor 37, an atmospheric pressure sensor 39, and an intake air temperature sensor 41. The engine revolution speed sensor 37 detects an engine speed (rpm) and outputs a corresponding engine speed signal to the control unit 13. The atmospheric pressure sensor 39 detects an atmospheric pressure and outputs a corresponding atmospheric pressure signal to the control unit 13. The intake air temperature sensor 41 detects the temperature of intake air and outputs a corresponding intake air temperature signal to the control unit 13.

The control unit 13 may comprise a processor and associated hardware as may be selected and programmed by a person of ordinary skill in the art based on the teachings of the present invention. Preferably, the control unit 13 is programmed to perform instructions for performing each step of the fuel injection timing control method according to an embodiment of the present invention.

The control unit 13 determines a base fuel injection timing based on at least one engine operating condition, and determines a final fuel injection timing by compensating the base fuel injection timing on the basis of a current boost pressure and a reference boost pressure. Preferably, the control unit 13 determines the reference boost pressure based on engine operating conditions and predetermined parameters, and calculates a difference between the reference boost pressure and the current boost pressure. The control unit 13 then compensates the basic fuel injection timing based on the calculated difference.

Figure 2:
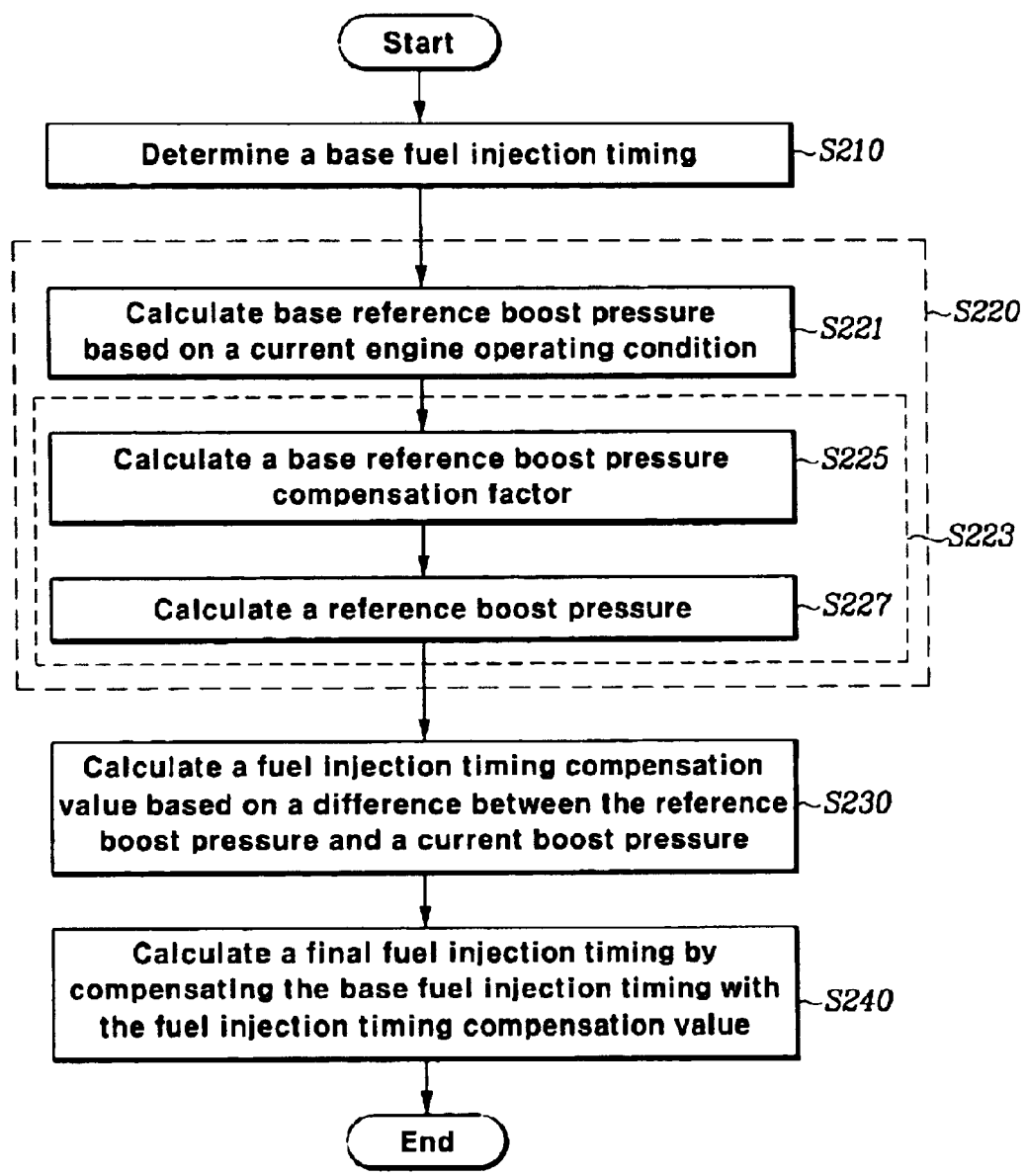
FIG. 2 is a flowchart showing a fuel injection timing control method according to an embodiment of the present invention.

Referring to FIG. 2, the fuel injection timing control according to an embodiment of the present invention will be explained in detail hereinbelow.

The fuel injection timing control method according to an embodiment of the present invention comprises: a step S210 for determining a base fuel injection timing; a step S220 for calculating a reference boost pressure based on current engine operating conditions; a step S230 for calculating a fuel injection timing compensating value based on a difference between the reference boost pressure and a current boost pressure; and a step S240 for calculating a final fuel injection timing by compensating the base fuel injection timing using the fuel injection timing compensating value.

The control unit 13 determines the base fuel injection timing based on a fuel injection amount and an engine speed (rpm) in step S210.

For example, the control unit 13 may determine the base fuel injection timing at a specific fuel injection amount and a specific engine speed from a base fuel injection timing table that has values of base fuel injection timings mapped according to fuel injection amounts and engine speeds. That is, the base fuel injection timing can be determined based on the engine speed (rpm) and the fuel injection amount (mg) as follows. Here, the fuel injection timing is an advance angle from TDC (Top Dead Center). Table 1 is a base fuel injection timing table showing base fuel injection timings determined for engine speeds of 500 rpm, 800 rpm, 120 rpm, 1600 rpm, 1800 rpm, 2200 rpm, and 2500 rpm, and for fuel injection amounts of 50 mg, 100 mg, 150 mg, 200 mg, and 250 mg. The base fuel injection timing is an optimal fuel injection timing under a specific engine speed and the specific fuel injection amount, and the base fuel injection timing can be determined through experiments.

TABLE 1

|     | 500 | 800 | 1200 | 1600 | 1800 | 2200 | 2500 |
|-----|-----|-----|------|------|------|------|------|
| 50  | -4  | -2  | 2    | 6    | 8    | 6    | 4    |
| 100 | -2  | 0   | 2    | 6    | 10   | 8    | 4    |
| 150 | 0   | 0   | 2    | 5    | 12   | 8    | 6    |
| 200 | 2   | 2   | 4    | 7    | 12   | 8    | 6    |
| 250 | 4   | 2   | 5    | 7    | 14   | 10   | 6    |

Base fuel injection timings for engine speeds and fuel injection amounts that are not shown in the Table 1 can be determined through an interpolation.

Then, in step S220, the control unit 13 calculates the reference boost pressure. The reference boost pressure is a boost pressure at a steady state (i.e., a state in which a transient state where a boost pressure change is completed) when an engine operates below a specific engine speed and a specific fuel injection amount.

The control unit 13 determines a base reference boost pressure based on current engine operating conditions (e.g., a fuel injection amount and an engine speed) in step S221.

Preferably, the base reference boost pressure is calculated using a predetermined base reference boost pressure table, on the basis of a current fuel injection amount and a current engine speed.

The predetermined base reference boost pressure table includes base reference boost pressure values mapped according to engine speeds and fuel injection amounts.

The base reference boost pressure values can be determined through experiments under specific conditions (an atmospheric pressure and an intake air temperature). That is, the base reference boost pressure table can be obtained using boost pressures detected under a steady state when an engine operates under a specific fuel injection amount and a specific engine speed.

Table 2 shows an example of the base reference boost pressure table that is obtained through experiments. In Table 2, base reference boost pressures (KPa) for engine speeds of 500 rpm, 800 rpm, 120 rpm, 1600 rpm, 1800 rpm, 2200 rpm, and 2500 rpm, and for fuel injection amounts of 50 mg, 100 mg, 150 mg, 200 mg, and 250 mg are shown.

TABLE 2

|     | 500 | 800 | 1200 | 1600 | 1800 | 2200 | 2500 |
|-----|-----|-----|------|------|------|------|------|
| 50  | 100 | 110 | 130  | 150  | 170  | 180  | 180  |
| 100 | 110 | 130 | 150  | 170  | 180  | 200  | 200  |
| 150 | 130 | 150 | 170  | 180  | 200  | 220  | 200  |
| 200 | 150 | 170 | 180  | 200  | 220  | 230  | 200  |
| 250 | 170 | 180 | 200  | 220  | 230  | 230  | 200  |

The control unit 13 calculates the base reference boost pressure at the current engine speed and the current fuel injection amount using data of the base reference boost pressure table.

Base reference boost pressures for engine speeds and fuel injection amounts that are not shown in Table 2 can be determined through interpolation.

Then, in step S223, the control unit compensates the base reference boost pressure using at least one compensation parameter.

The step S223 may comprise a step S225 for calculating the base reference boost pressure compensation factor and a step S227 for calculating the reference boost pressure.

Because the base reference boost pressure calculated in step S221 is obtained under a specific atmospheric pressure and a specific intake air temperature, the reference boost pressure is calculated by compensating the base reference boost pressure using a compensation factor determined according to a current atmospheric pressure and a current intake air temperature.

The control unit 13 calculates the base reference boost pressure compensation factor based on at least one compensation parameter in step S225.

The compensation parameter may comprise an atmospheric pressure and an intake air temperature.

For example, the control unit 13 may calculate the base reference boost pressure compensation factor using a table having compensation factor values mapped according to an atmospheric pressure and an intake air temperature. In Table 3, base reference boost pressure compensation factors for intake air temperatures of 263K, 273K, 283K, 293K, 303K, 313K, and 323K, and for atmospheric pressures of 75 KPa, 80 KPa, 90 Kpa, 100 Kpa, and 105 KPa are shown.

TABLE 3

|     | 263  | 273  | 283  | 293  | 303  | 313  | 323  |
|-----|------|------|------|------|------|------|------|
| 75  | 0.90 | 0.90 | 0.90 | —    | —    | —    | —    |
| 80  | 0.93 | 0.95 | 0.95 | 0.90 | —    | —    | —    |
| 90  | —    | 0.98 | 1.00 | 0.95 | 0.90 | —    | —    |
| 100 | —    | —    | 1.03 | 1.00 | 0.95 | 0.90 | —    |
| 105 | —    | —    | 1.05 | 1.03 | 1.00 | 0.98 | —    |

Base reference boost pressure compensation factors for intake air temperatures and atmospheric pressures that are not shown in Table 3 can be determined through interpolation.

The, in step S227, the control unit 13 calculates the reference boost pressure by compensating the base reference boost pressure using the base reference boost pressure compensation factor.

For example, the reference boost pressure can be calculated by multiplying the base reference boost pressure by the base reference boost pressure compensation factor.

Then, in step S230, the control unit 13 calculates a fuel injection timing compensation value based on a difference between the reference boost pressure and a current boost pressure.

For example, the fuel injection timing compensation value can be calculated using a table having fuel injection timing compensation values determined for differences between the reference boost pressure and a current boost pressure. In Table 4, fuel injection timing compensation values (e.g., ignition advance angle) when differences between the reference boost pressure and the current boost pressure are respectively −30 KPa, −20 KPa, 0 KPa, 20 KPa, 50 KPa, 100 KPa, 130 KPa, and 150 KPa.

TABLE 4

| -30 | -20 | 0 | 20 | 50 | 100 | 130 | 150 |
|-----|-----|---|----|----|-----|-----|-----|
| -3  | -2  | 0 | 2  | 4  | 6   | 8   | 10  |

Fuel injection timing compensation values for differences between the reference boost pressure and the current boost pressure that are not shown in Table 4 can be determined through interpolation.

As shown in Table 4, the fuel injection timing compensation value is preferably determined as a value that further advances the fuel injection timing as a difference between the reference boost pressure and the current boost pressure increases.

Then, in step S240, the control unit 13 calculates the final fuel injection timing by compensating the base fuel injection timing with the fuel injection timing compensation value.

For example, the final fuel injection timing can be calculated by adding the fuel injection timing compensation value to the base fuel injection timing.

According to embodiments of the present invention, by compensating the fuel injection timing based on a difference between a reference boost pressure and a current boost pressure, problems of deterioration of acceleration performance and an increase of fuel consumption that are caused by turbo lag of a diesel engine can be solved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A fuel injection timing control method, comprising:
   determining a base fuel injection timing:
   calculating a reference boost pressure based on a current engine operating condition;
   calculating a fuel injection timing compensation value based on a difference between the calculated reference boost pressure and a current boost pressure; and
   calculating a final fuel injection timing by compensating the base fuel injection timing with the fuel injection timing compensation value.

2. The fuel injection timing control method of claim 1, wherein the calculating a reference boost pressure comprises:
   calculating a base reference boost pressure based on the current engine operating condition; and
   calculating the reference boost pressure by compensating the base reference boost pressure with at least one compensation parameter.

3. The fuel injection timing control method of claim 2, wherein the calculating the reference boost pressure comprises:
   calculating a base reference boost pressure compensation factor based on the at least one compensation parameter; and
   calculating the reference boost pressure by compensating the base reference boost pressure with the base reference boost pressure compensation factor.

4. The fuel injection timing control method of claim 3, wherein the base reference boost pressure is calculated using a base reference boost pressure table having base reference boost pressure values determined for the current engine operating condition and a predetermined engine operating condition.

5. The fuel injection timing control method of claim 4, wherein the current engine operating condition comprises a current engine speed and a current fuel injection amount.

6. The fuel injection timing control method of claim 3, wherein the base reference boost pressure compensation factor is calculated using a base reference boost pressure compensation factor table having base reference boost pressure compensation factor values determined for the at least one compensation parameter and a predetermined parameter.

7. The fuel injection timing control method of claim 6, wherein the compensation parameter comprises an atmospheric pressure and an intake air temperature.

8. The fuel injection timing control method of claim 3, wherein the reference boost pressure is calculated by multiplying the base reference boost pressure by the base reference boost pressure compensation factor.

9. The fuel injection timing control method of claim 1, wherein the fuel injection timing compensation value is determined as a value that further advances the fuel injection timing as a difference between the reference boost pressure and the current boost pressure increases.

10. The fuel injection timing control method of claim 1, wherein the base fuel injection timing is determined based on an engine speed and a fuel injection amount.

11. A fuel injection timing control system comprising:
   at least one engine operating condition sensor for detecting an engine operating condition;
   a boost pressure sensor for detecting a boost pressure;
   a fuel injector for injecting fuel into a combustion chamber; and
   a control unit for controlling a fuel injection timing of the fuel injector based on the engine operating condition and the boost pressure,
      wherein the control unit is programmed to perform instructions for determining a base fuel injection timing,
   calculating a reference boost pressure based on a current engine operating condition,
   calculating a fuel injection timing compensation value based on a difference between the calculated reference boost pressure and a current boost pressure, and
   calculating a final fuel injection timing by compensating the base fuel injection timing with the fuel injection timing compensation value.

12. The fuel injection timing control system of claim 11, wherein the calculating a reference boost pressure comprises:
   calculating a base reference boost pressure based on the current engine operating condition; and
   calculating the reference boost pressure by compensating the base reference boost pressure with at least one compensation parameter.

13. The fuel injection timing control system of claim 12, wherein the calculating the reference boost pressure comprises:
   calculating a base reference boost pressure compensation factor based on the at least one compensation parameter; and
   calculating the reference boost pressure by compensating the base reference boost pressure with the base reference boost pressure compensation factor.

14. The fuel injection timing control system of claim 13, wherein the base reference boost pressure is calculated using a base reference boost pressure table having base reference boost pressure values determined for the current engine operating condition and a predetermined engine operating condition.

15. The fuel injection timing control system of claim 14, wherein the at least one engine operating condition sensor comprises an engine speed sensor for detecting an engine speed, and wherein the current engine operating condition comprises a current engine speed and a current fuel injection amount.

16. The fuel injection timing control system of claim 13, wherein the base reference boost pressure compensation factor is calculated using a base reference boost pressure compensation factor table having base reference boost pressure compensation factor values determined for the at least one compensation parameter and a predetermined parameter.

17. The fuel injection timing control system of claim 16, wherein the at least one engine operating condition sensor comprises an atmospheric pressure sensor for detecting an atmospheric pressure and an intake air temperature sensor for detecting an intake air temperature, and wherein the compensation parameter comprises an atmospheric pressure and an intake air temperature.

18. The fuel injection timing control system of claim 13, wherein the reference boost pressure is calculated by multiplying the base reference boost pressure by the base reference boost pressure compensation factor.

19. The fuel injection timing control system of claim 11, wherein the fuel injection timing compensation value is determined as a value that further advances the fuel injection timing as a difference between the reference boost pressure and the current boost pressure increases.

20. The fuel injection timing control system of claim 11, wherein the base fuel injection timing is determined based on an engine speed and a fuel injection amount.

* * * * *